United States Patent
Yoshida et al.

(10) Patent No.: US 9,521,273 B2
(45) Date of Patent: Dec. 13, 2016

(54) INFORMATION PROCESSING DEVICE AND RECORDING MEDIUM THAT ENSURES REDUCED COUNT OF TIMES OF BAND PROCESSING

(71) Applicant: KYOCERA Document Solutions Inc., Osaka (JP)

(72) Inventors: Daisuke Yoshida, Osaka (JP); Satoshi Kawakami, Osaka (JP); Takahiro Minami, Osaka (JP); Akira Yuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/952,368

(22) Filed: Nov. 25, 2015

(65) Prior Publication Data

US 2016/0156791 A1    Jun. 2, 2016

(30) Foreign Application Priority Data

Nov. 28, 2014 (JP) ................................ 2014-241348

(51) Int. Cl.
G06F 3/12 (2006.01)
H04N 1/00 (2006.01)
G06K 15/02 (2006.01)

(52) U.S. Cl.
CPC ............ *H04N 1/00238* (2013.01); *G06F 3/12* (2013.01); *G06K 15/1851* (2013.01); *G06K 15/1857* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2006/0209369 A1* | 9/2006 | Yasunaga | G06K 9/00463 358/538 |
| 2009/0073466 A1* | 3/2009 | Awata | H04N 1/60 358/1.9 |
| 2010/0202010 A1* | 8/2010 | Xiao | G06F 17/30905 358/1.15 |
| 2011/0069339 A1* | 3/2011 | Huang | G06F 3/1204 358/1.15 |

FOREIGN PATENT DOCUMENTS

| | | |
|---|---|---|
| JP | 2001-243023 A | 9/2001 |
| JP | 2013-119237 A | 6/2013 |
| JP | 2013-225256 A | 10/2013 |

* cited by examiner

*Primary Examiner* — Huo Long Chen
(74) *Attorney, Agent, or Firm* — Stein IP, LLC

(57) ABSTRACT

An information processing device includes a communication circuit, a storage circuit, a communications control circuit, a spool circuit, a RIP processing circuit, a matching circuit, and a grouping circuit. The RIP processing circuit rasterizes the stored one or more pieces of document data to generate one or more pieces of rasterized data. The matching circuit performs matching processing of the generated one or more pieces of rasterized data. The grouping circuit groups pieces of rasterized data with an identical content one another among the one or more pieces of rasterized data based on the result of the matching processing. The communications control circuit transmits the grouped one or more pieces of rasterized data to an image forming apparatus by each of the groups via the communication circuit.

10 Claims, 5 Drawing Sheets

INFORMATION PROCESSING DEVICE AND RECORDING MEDIUM THAT ENSURES REDUCED COUNT OF TIMES OF BAND PROCESSING

INCORPORATION BY REFERENCE

This application is based upon, and claims the benefit of priority from, corresponding Japanese Patent Application No. 2014-241348 filed in the Japan Patent Office on Nov. 28, 2014, the entire contents of which are incorporated herein by reference.

BACKGROUND

Unless otherwise indicated herein, the description in this section is not prior art to the claims in this application and is not admitted to be prior art by inclusion in this section.

Image forming apparatuses have been variously improved so as to perform efficient print jobs.

For example, a technique uses redundant hardware to simultaneously process: an operation to supply rasterized data to a print output device, and Raster Image Processor (RIP) processing for the next print job, in parallel. This ensures a print control apparatus to perform processing efficiently.

Another technique predicts a time required to transmit print data to an image forming apparatus after a rasterize processing in a print job transmitting device and a time required to transmit print data without any process to the image forming apparatus to cause the image forming apparatus to rasterize the print data. The technique selects a method with shorter process time.

Yet another technique sends an Email, which is simultaneously delivered to a plurality of users, to an image forming apparatus, and predicts to receive a print job to print a file attached to the simultaneously delivered Email from a plurality of the users who received the Email.

Then, the technique does not execute the print job until all the print jobs are received. The technique executes the print jobs at a time after all the print jobs are received to reduce switching the mode of the image forming apparatus frequently between the power-saving mode and the normal mode. This ensures the image forming apparatus to reduce electric power consuming in the transition to the normal mode.

SUMMARY

An information processing device according to an aspect of the disclosure includes a communication circuit, a storage circuit, a communications control circuit, a spool circuit, a RIP processing circuit, a matching circuit, and a grouping circuit. The communications control circuit accepts one or more print job received from outside via the communication circuit. The spool circuit causes the storage circuit to store one or more pieces of document data. The one or more pieces of document data is each included in the accepted one or more print job. The RIP processing circuit rasterizes the stored one or more pieces of document data to generate one or more pieces of rasterized data. The matching circuit performs matching processing of the generated one or more pieces of rasterized data. The grouping circuit groups pieces of rasterized data with an identical content one another among the one or more pieces of rasterized data based on the result of the matching processing. The communications control circuit transmits the grouped one or more pieces of rasterized data to an image forming apparatus by each of the groups via the communication circuit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
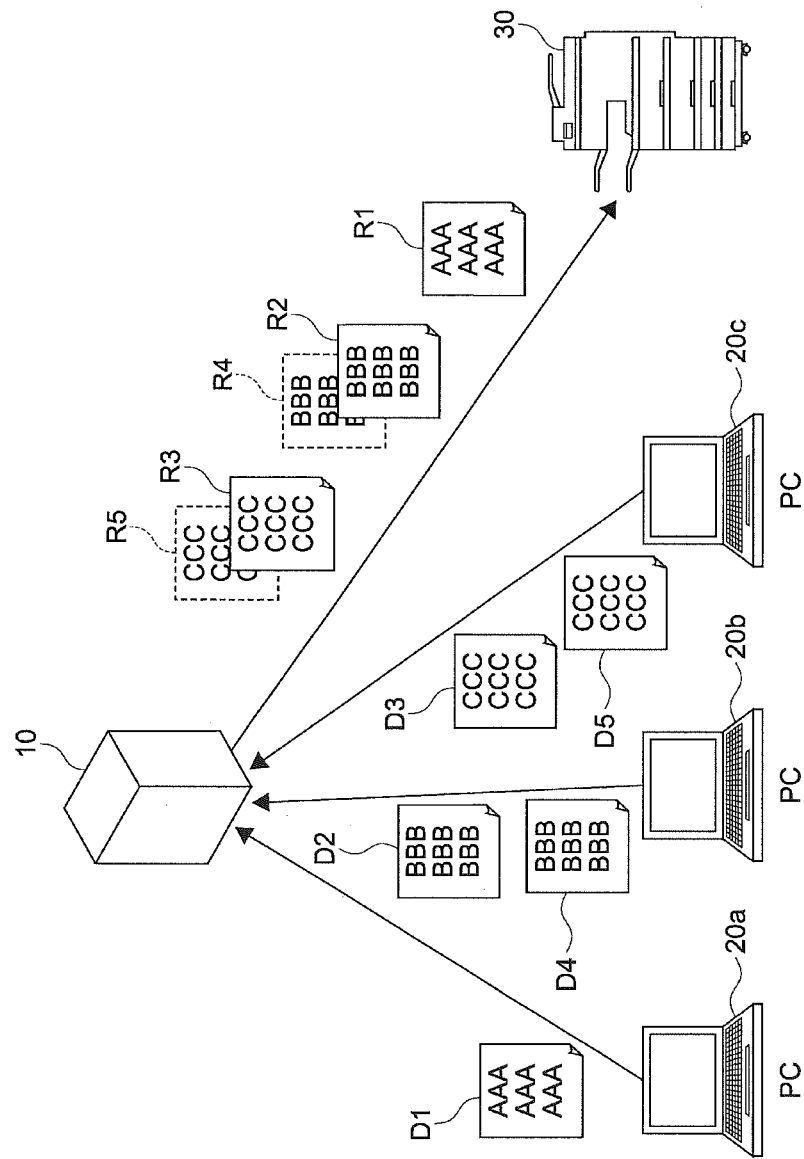
FIG. 1 illustrates an outline of an overall configuration including an information processing device according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.
Outline First, a description will be given of an outline of an overall configuration including an information processing device according to the embodiment of the disclosure. FIG. 1 illustrates an outline of an overall configuration including an information processing device 10 according to the embodiment of the disclosure.

First, Personal Computers (PCs) 20a, 20b, and 20c, each of which connects to the information processing device 10 via a network, transmit a print job of a document to the information processing device 10.

The information processing device 10 performs Simultaneous Peripheral Operations On-Line (Spool) to the received print job, and performs RIP processing to make the print job rasterized data. Then, the information processing device 10 compares the content of the rasterized data to group the rasterized data with an identical content.

Then, the information processing device 10 transmits the rasterized data to an image forming apparatus (Multifunction Peripheral: MFP) 30 by each group to cause the image forming apparatus 30 to print the rasterized data. The image forming apparatus 30 may be a common image forming apparatus insofar as the image forming apparatus can print the rasterized data.

The order of the document of which the print job is transmitted from the PCs 20a, 20b, and 20c to the information processing device 10 is in the order of documents D1, D2, D3, D4, and D5.

Here, assume that the content of the document D2 and the content of the document D4 is identical, and the content of the document D3 and the content of the document D5 is identical.

In FIG. 1, while the document D2 and the document D4 are transmitted from the PC 20b, the document D2 and the document D4 may be transmitted from a PC different from each other. The same applies to the document D3 and the document D5.

The information processing device 10 performs the RIP processing to the document data D1, D2, D3, D4, and D5 of the received print job to generate the rasterized data R1, R2, R3, R4, and R5 respectively.

Figure 2:
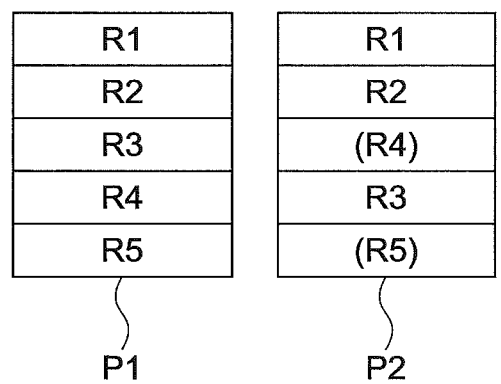
FIG. 2 illustrates an order for transmitting rasterized data to the image forming apparatus according to the embodiment of the disclosure comparing with an order in a comparative example.

In a comparative example, the order where the pieces of rasterized data R1 to R5 are transmitted to the image forming apparatus 30 is in the order of the rasterized data R1, R2, R3, R4, and R5 as illustrated in the left side P1 of FIG. 2, as well as the order where the information processing device 10 receives the print job.

In this case, the image forming apparatus 30 performs band processing five times.

In contrast to this, the information processing device 10 according to the embodiment of the disclosure groups the rasterized data by contents of the print job irrespective of the order of receiving the print jobs, and transmits the rasterized data to the image forming apparatus 30 by each group. This ensures the image forming apparatus 30 to reduce the count of times of band processing.

For example, in the above-described case, as illustrated in the right side P2 of FIG. 2, after the rasterized data of a group constituted of the rasterized data R1 is transmitted to the image forming apparatus 30, the rasterized data of a group constituted of the rasterized data R2 and R4 is transmitted to the image forming apparatus 30, and lastly, the rasterized data of a group constituted of the rasterized data R3 and R5 is transmitted to the image forming apparatus 30.

This ensures the image forming apparatus 30 to reduce the count of times of band processing to three times.

Reducing the count of times of band processing realizes the reduction of the power consumption and the shortening the net processing time in the image forming apparatus 30.

When the image forming apparatus 30 prints the rasterized data R4 and R5, the band processing is not necessary to be performed, the image forming apparatus 30 can execute the print job at a linear velocity.

As the rasterized data R4 and R5 illustrated by dotted lines in FIG. 1, these two data can be omitted to transmit via the network. Instead, when the rasterized data R2 and R3 are transmitted, it is enough to give an instruction to print two copies of the rasterized data R2 and R3 respectively to the image forming apparatus 30. This ensures to reduce the transmit amount via the network. Then, the network resource consumption can be reduced.

Above described the outline of the overall configuration including the information processing device 10 according to the embodiment of the disclosure.

Configuration

Figure 3:
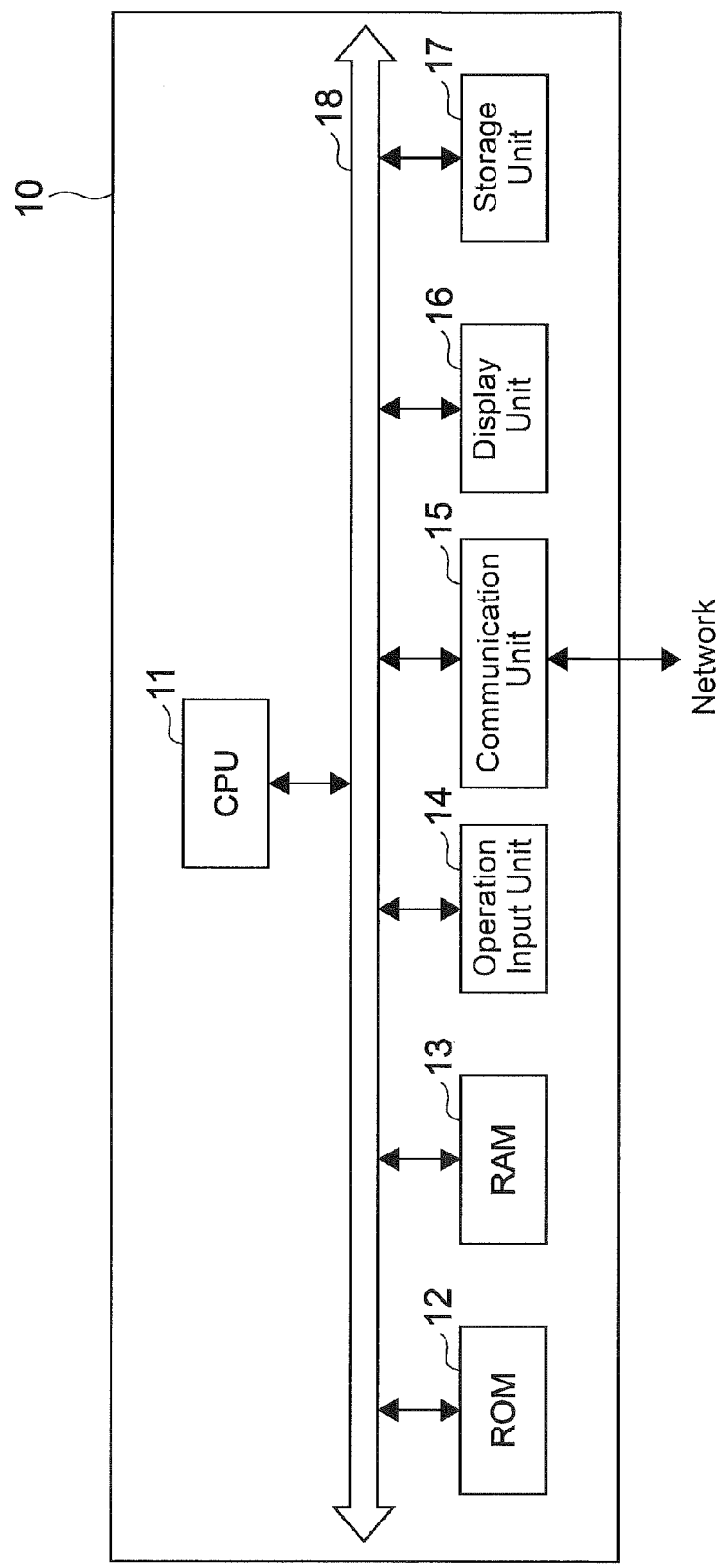
FIG. 3 illustrates a configuration of the information processing device according to the embodiment when the information processing device is constituted of a common computer.

Next, the configuration of the information processing device 10 will be described. The information processing device 10 may be constituted of a dedicated hardware and software, or may be constituted of a common computer. FIG. 3 illustrates a configuration of the information processing device 10 when the information processing device 10 is constituted of a common computer.

As illustrated in FIG. 3, the information processing device 10 includes a Central Processing Unit (CPU) 11, a Read Only Memory (ROM) 12, a Random Access Memory (RAM) 13, an operation input unit 14, a communication unit 15 (which is also referred to as communication circuit), a display unit 16, and a storage unit 17 (which is also referred to as storage circuit). These blocks are connected each other via a bus 18.

The ROM 12 stores a plurality of programs and data such as a firmware for executing various processing. The RAM 13 is used as a work area of the CPU 11 to hold Operating System (OS), various applications in execution, and various data in processing temporarily.

The storage unit 17 is, for example, a Hard Disk Drive (HDD), a flash memory, and other non-volatile memory. The storage unit 17 stores OS, various applications, and various data.

The communication unit 15 is connected to a network to exchange information with the PCs 20a, 20b, and 20c, and the image forming apparatus 30.

The CPU 11 expands a program corresponding to an instruction provided from the operation input unit 14 among a plurality of the programs stored in the ROM 12 and the storage unit 17 on the RAM 13. The CPU 11 controls the display unit 16 and the storage unit 17 as necessary according to the expanded program. The CPU 11 is an example of the control unit, and another control unit may be applicable to the disclosure instead of the CPU 11. The control unit, which is a processor having one or more circuits, can load the various programs to execute and also can execute the various programs incorporated inside in advance. Here, the circuit may be an electronic component or an electronic substrate to which a plurality of electronic elements are connected through the wiring.

The operation input unit 14 is, for example, a pointing device such as a computer mouse, a keyboard, a touch panel, and other operating device.

The display unit 16 is, for example, a liquid crystal display, an Electro-Luminescence (EL) display, a plasma display, and similar display.

Figure 4:
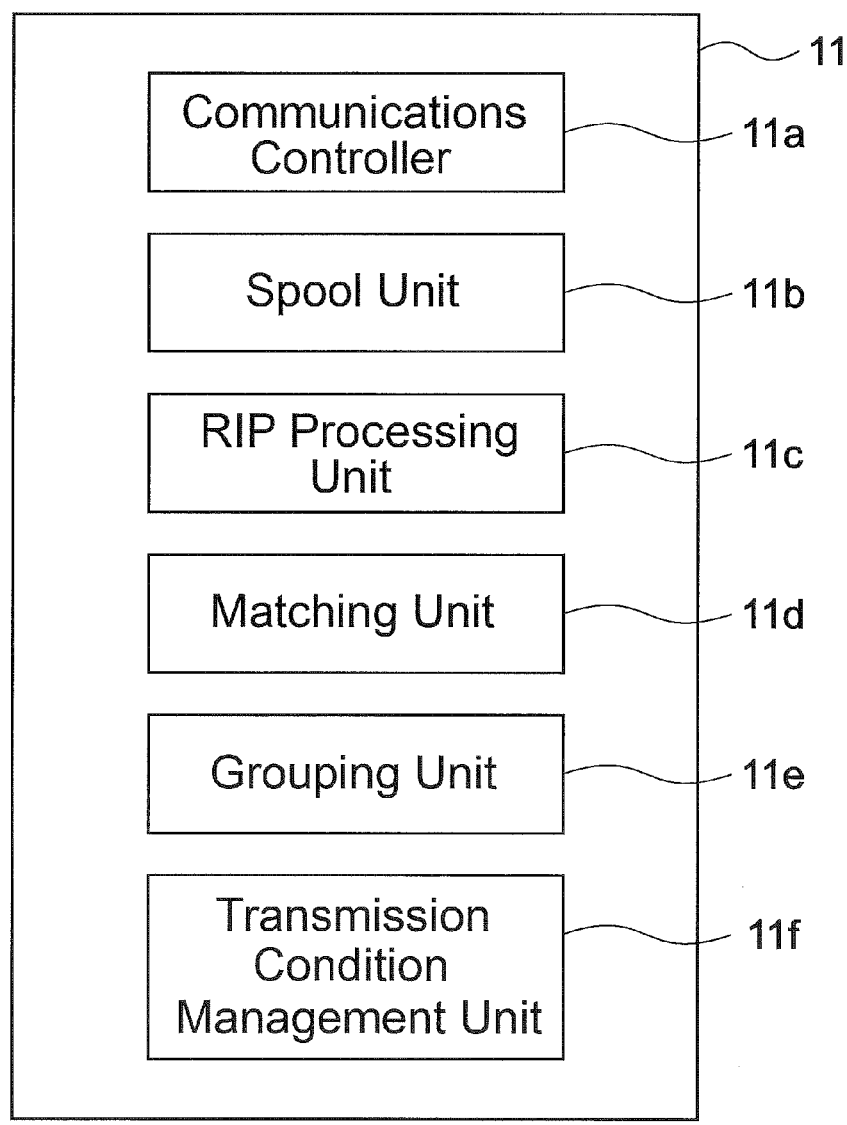
FIG. 4 illustrates function blocks achieved by execution of programs in a CPU according to the embodiment.

Next, function blocks achieved by the execution of the program in the CPU 11 will be described. FIG. 4 illustrates function blocks achieved by the execution of the program in the CPU 11.

The function blocks achieved in the CPU 11 of the information processing device 10 includes a communications controller 11a (which is also referred to as communications control circuit), a spool unit 11b (which is also referred to as spool circuit), a RIP processing unit 11c (which is also referred to as RIP processing circuit), a matching unit 11d (which is also referred to as matching circuit), a grouping unit 11e (which is also referred to as grouping circuit), and a transmission condition management unit 11f.

The communications controller 11a receives the print job and transmits the rasterized data to the image forming apparatus 30 to control the communication unit 15.

The spool unit 11b causes the storage unit 17 to store the document data included in the received print job and the rasterized data performed RIP processing on the document data, and extracts the data.

The RIP processing unit 11c performs rasterize processing on the document data included in the print job to generate the rasterized data.

The matching unit 11d performs matching processing on the rasterized data each other.

The grouping unit 11e groups the rasterized data with the identical content based on the result of matching processing.

The transmission condition management unit 11f transmits the grouped rasterized data stored in the storage unit 17 to the image forming apparatus 30 when the condition, which is set by such as a user, is satisfied.

Above described the configuration of the information processing device 10.

Flow of Processing

Figure 5:
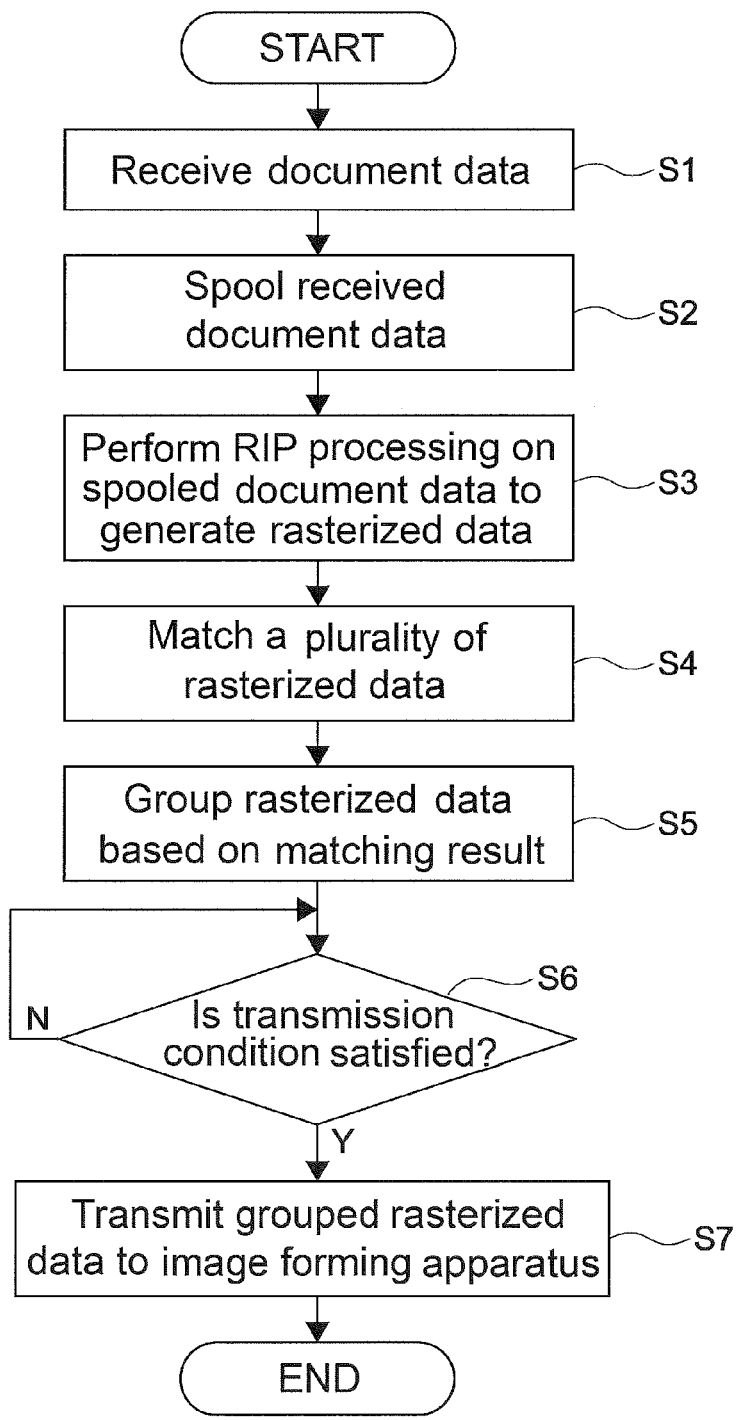
FIG. 5 illustrates a flow of processing in the information processing device according to the embodiment.

Next, the flow of the processing in the information processing device 10 will be described. FIG. 5 illustrates the flow of the processing in the information processing device 10.

First, the communications controller 11a receives the print job including the document data from the PCs 20a, 20b, and 20c (Step S1). Here, the document data is the content of not rasterized, the content described in a page description language, or similar content.

Next, the spool unit 11b spools the received document data to cause the storage unit 17 to store the document data (Step S2).

Next, the RIP processing unit 11c performs RIP processing on the spooled document data to generate the rasterized data (Step S3).

Next, the matching unit 11d performs matching processing on the rasterized data generated at Step S3 each other (Step S4).

Next; the grouping unit 11e groups the rasterized data with the identical content each other based on the result of the matching processing performed at Step S4 (Step S5).

When the grouping unit 11e groups the rasterized data with the identical content, the grouping unit 11e may generate a plurality of the rasterized data including one piece of rasterized data to indicate the content and count information to indicate a count of the pieces of rasterized data constituting the group.

Next, the transmission condition management unit 11f determines whether or not the transmission condition is satisfied (Step S6).

Here, the transmission condition is, for example, a condition that the count of the pieces of rasterized data, which is stored in the storage unit 17 and grouped, reached the count of data set, a condition that the total amount of the rasterized data reached the capacity set, a condition that the time to transmit the grouped rasterized data to the image forming apparatus 30 has come, and similar condition. The user can set these conditions.

When the transmission condition is satisfied (YES at Step S6), the communications controller 11a transmits the grouped rasterized data stored in the storage unit 17 to the image forming apparatus 30 by each group (Step S7).

When the transmission condition is not satisfied (NO at Step S6), the transmission condition management unit 11f returns the process before Step S6 to repeat the process.

Above described the flow of the processing in the information processing device 10.

Supplementary Note

The disclosures are not limited to the above-described embodiment, many variations thereof are possible without departing from the spirit of the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

FIG. 3
14 Operation Input Unit
15 Communication Unit
16 Display Unit
17 Storage Unit
Network
FIG. 4
11a Communications Controller
11b Spool Unit
11c Rip Processing Unit
11d Matching Unit
11e Grouping Unit
11f Transmission Condition Management Unit
FIG. 5
START
S1 Receive document data
S2 Spool received document data
S3 Perform RIP processing on spooled document data to generate rasterized data
S4 Match a plurality of rasterized data
S5 Group rasterized data based on matching result
S6 Is transmission condition satisfied?
S7 Transmit grouped rasterized data to image forming apparatus
END

What is claimed is:

1. An information processing device, comprising:
a communication circuit;
a storage circuit;
a communications control circuit that accepts on or more print job received from outside via the communication circuit;
a spool circuit that causes the storage circuit to store one or more pieces of document data, the one or more pieces of document data being each included in the accepted one or more print job;
a RIP processing circuit that rasterizes the stored one or more pieces of document data to generate one or more pieces of rasterized data, the one or more pieces of rasterized data corresponding to the stored one or more pieces of document data, respectively;
a matching circuit that performs matching processing of the generated one or more pieces of rasterized data; and
a grouping circuit that groups pieces of rasterized data, corresponding to different places of document data, with an identical content among the one or more pieces of rasterized data based on the result of the matching processing;
wherein the communications control circuit transmits the grouped one or more pieces of rasterized data to an image forming apparatus by each of the groups via the communication circuit,
wherein the grouping circuit generates any one of pieces of rasterized data to indicate the content and count information to indicate a count of the pieces of rasterized data constituting the group when the grouping circuit groups the rasterized data, corresponding to the different pieces of document data, with the identical content, and
wherein the communications control circuit transmits the generated one piece of rasterized data to indicate the content and the count information to indicate the count of the pieces of rasterized data constituting the group to the image forming apparatus by each of the groups.

2. The information processing device according to claim 1, further comprising:
a setting condition management circuit that causes the communications control circuit to transmit the grouped one or more pieces of rasterized data to the image forming apparatus by each of the groups when a specific condition is satisfied.

3. The information processing device according to claim 2,
wherein the specific condition indicates that a count of the grouped one or more pieces of rasterized data has reached a count of data set.

4. The information processing device according to claim 2,
wherein the specific condition indicates that a total amount of the one or more pieces of rasterized data has reached a capacity set.

5. The information processing device according to claim 2,
wherein the specific condition indicates that a time to transmit the grouped one or more pieces of rasterized data to the image forming apparatus has come.

6. A non-transitory computer-readable recording medium storing an information processing program, the information processing program causing an information processing device to function as:
a communication circuit;
a storage circuit;
a communications control circuit that accepts one or more print job received from outside via the communication circuit;
a spool circuit that causes the storage circuit to store one or more pieces of document data, the one or more pieces of document data being each included in the accepted one or more print job;
a RIP processing circuit that rasterizes the stored one or more pieces of document data to generate one or more pieces or rasterized data, the one or more pieces of rasterized data corresponding to the stored one or more pieces of document data, respectively;
a matching circuit that performs matching processing of the generated one or more pieces of rasterized data; and
a grouping circuit that groups pieces of rasterized data, corresponding to different pieces of document data, with an identical content among the one or more pieces of rasterized data based on the result of the matching processing;
wherein the communications control circuit transmits the grouped one or more pieces of rasterized data to an image forming apparatus by each of the groups via the communication circuit;
wherein the grouping circuit generates any one of pieces of rasterized data to indicate the content and count information to indicate a count of the pieces of rasterized data constituting the group when the grouping circuit groups the rasterized data, corresponding to the different pieces of document data, with the identical content, and
wherein the communications control circuit transmits the generated one piece of rasterized data to indicate the content and the count information to indicate the count of the pieces of rasterized data constituting the group to the image forming apparatus by each of the groups.

7. The non-transitory computer-readable recording medium according to claim 6,
wherein the information processing program causing an information processing device to function as a setting condition management circuit that causes the communications control circuit to transmit the grouped one or more pieces of rasterized data to the image forming apparatus by each of the groups when a specific condition is satisfied.

8. The non-transitory computer-readable recording medium according to claim 7,
wherein the specific condition indicates that a count of the grouped one or more pieces of rasterized data has reached a count of data set.

9. The non-transitory computer-readable recording medium according to claim 7,
wherein the specific condition indicates that a total amount of the one or more pieces of rasterized data has reached a capacity set.

10. The non-transitory computer-readable recording medium according to claim 7,
wherein the specific condition indicates that a time to transmit the grouped one or more pieces of rasterized data to the image forming apparatus has come.

* * * * *